US012732937B2

(12) United States Patent
Chen et al.

(10) Patent No.: US 12,732,937 B2
(45) Date of Patent: Sep. 8, 2026

(54) TIMING ADVANCE TA DETERMINING METHOD AND COMMUNICATIONS APPARATUS

(71) Applicant: HUAWEI TECHNOLOGIES CO., LTD., Shenzhen (CN)

(72) Inventors: Ying Chen, Hangzhou (CN); Xinghua Song, Beijing (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 18/651,367

(22) Filed: Apr. 30, 2024

(65) Prior Publication Data

US 2024/0284372 A1 Aug. 22, 2024

Related U.S. Application Data

(63) Continuation of application No. PCT/CN2022/119118, filed on Sep. 15, 2022.

(30) Foreign Application Priority Data

Oct. 30, 2021 (CN) ........................ 202111277807.6

(51) Int. Cl.
*H04W 56/00* (2009.01)
*H04W 84/06* (2009.01)

(52) U.S. Cl.
CPC ..... *H04W 56/0045* (2013.01); *H04W 56/006* (2013.01); *H04W 84/06* (2013.01)

(58) Field of Classification Search
None
See application file for complete search history.

(56) References Cited

U.S. PATENT DOCUMENTS

2021/0314894 A1* 10/2021 Lauridsen ......... H04W 56/0005
2024/0340074 A1* 10/2024 Yan .................. H04W 56/0005

FOREIGN PATENT DOCUMENTS

WO 2023012403 A1 2/2023

OTHER PUBLICATIONS

Qualcomm Incorporated, "Enhancements to time and frequency synchronization," 3GPP TSG RAN WG1 #106-e, R1-2106760, Aug. 16-27, 2021, 4 pages.

(Continued)

*Primary Examiner* — Anh Ngoc M Nguyen
(74) *Attorney, Agent, or Firm* — Fish & Richardson P.C.

(57) ABSTRACT

A terminal determines a validity duration of a first parameter and a validity duration of a second parameter. The first parameter includes positioning information of the terminal, and the second parameter includes one or more of the following information: ephemeris information of a serving satellite and common timing advance (TA) information. Then, the terminal determines an invalidation moment of the first parameter and an invalidation moment of the second parameter based on a validation moment of the first parameter, a validation moment of the second parameter, the validity duration of the first parameter, and the validity duration of the second parameter. The terminal updates the first parameter and the second parameter at or before an earlier invalidation moment in the invalidation moment of the first parameter and the invalidation moment of the second parameter. The terminal determines a TA adjustment value based on an updated first parameter and an updated second parameter.

17 Claims, 9 Drawing Sheets

(56) References Cited

OTHER PUBLICATIONS

Nokia et al., "Enhancement to time and frequency synchronization for NB—IoT/eMTC over NTN," 3GPP TSG RAN WG1 #106bis, R1-2109265, Oct. 11-19, 2021, 16 pages.

Apple, "Discussion on timing requirements for NR NTN," 3GPP TSG-RAN4 Meeting #101-e, R4-2117455, Nov. 1-12, 2021, 12 pages.

Extended European Search Report in European Appln. No. 22885478.2, mailed on Jan. 27, 2025, 14 pages.

* cited by examiner

Input/Output unit 1001

Processing unit 1002

TIMING ADVANCE TA DETERMINING METHOD AND COMMUNICATIONS APPARATUS

CROSS-REFERENCE TO RELATED APPLICATIONS

This application is a continuation of International Application No. PCT/CN2022/119118, filed on Sep. 15, 2022, which claims priority to Chinese Patent Application No. 202111277807.6, filed on Oct. 30, 2021. The disclosures of the aforementioned applications are hereby incorporated by reference in their entireties.

TECHNICAL FIELD

Embodiments of this application relate to the field of communications technologies, and in particular, to a TA determining method and a communications apparatus.

BACKGROUND

Because different user equipments (UEs) are at different distances from a base station, uplink information sent by the different UEs arrives at the base station at different moments, and signal interference occurs. Therefore, the base station expects that time when signals from different UEs in a same subframe arrive at the base station is basically aligned, so that the base station can correctly receive uplink data sent by the UEs. A timing advance (timing advance, TA) is introduced, to enable the base station to correctly receive the uplink data of the UEs.

In terrestrial communication, the base station may estimate a TA of a UE based on a random access preamble sent by the UE (UEs at different distances from the base station have different TAs), and then notify the UE of a timing advance command (TAC), and the UE may determine a value of the TA based on the TAC. Different UEs send uplink data based on different corresponding TAs (the different TAs are equal to round-trip transmission delays from the UEs to the base station). From a perspective of the base station, all uplink/downlink system frames are aligned, and the base station may receive, in a same subframe, uplink data from a plurality of UEs. The foregoing TAC mechanism may be understood as a closed-loop TA adjustment mechanism. However, in satellite communication, a distance between a satellite and a UE is long, and a delay is long, making it inaccurate to determine a TA directly based on a TAC. Therefore, an open-loop TA adjustment mechanism (that is, the UE does not need to send a preamble for TA estimation) is introduced, to ensure uplink synchronization in satellite communication. However, in satellite communication, after receiving a TAC, a terminal determines a current TA (the TA may compensate for errors of a global navigation satellite system (GNSS), ephemeris information, and common TA information) by accumulating a previous TA. In addition, during location update or ephemeris information listening, the errors of the ephemeris information, the common TA information, and the GNSS may be accumulated to the TA again. As a result, a calculated TA error is inaccurate, and a value of the determined TA is also inaccurate.

SUMMARY

This application provides a TA determining method and a communications apparatus, to reduce an error jump during determining of a TA adjustment value, and improve accuracy of the TA adjustment value.

According to a first aspect, this application provides a TA determining method. The method may be performed by a terminal. The terminal may be understood as a UE, an in-vehicle device, a chip of a terminal, or the like. A type of the terminal is not specifically limited herein in this application. The terminal may communicate with a satellite. In this application, the satellite may be a geostationary satellite, a non-geostationary satellite, an artificial satellite, a low earth orbit satellite, a medium earth orbit satellite, a high earth orbit satellite, or the like. This is not specifically limited herein in this application.

The terminal may determine validity duration of a first parameter and validity duration of a second parameter, where the first parameter includes positioning information of the terminal, and the second parameter includes one or more of the following information: ephemeris information of a serving satellite and common TA information; then determine an invalidation moment of the first parameter and an invalidation moment of the second parameter based on a validation moment of the first parameter, a validation moment of the second parameter, the validity duration of the first parameter, and the validity duration of the second parameter; and update the first parameter and the second parameter at or before an earlier invalidation moment in the invalidation moment of the first parameter and the invalidation moment of the second parameter. The terminal may determine a TA adjustment value based on an updated first parameter and an updated second parameter; and communicate with the serving satellite based on the TA adjustment value.

It should be noted that the validity duration of the first parameter may be determined based on a moving speed of the terminal device, or may be determined based on duration of a timer delivered by a network side device. The network side device may be understood as the serving satellite, a terrestrial gateway, a terrestrial base station, or the like. This is not specifically limited herein in this application. The second parameter is continuously broadcast, and does not need to be updated by the terminal device. The terminal only needs to perform listening at a moment. Therefore, in actual application, the updating the second parameter should be understood as listening, obtaining, or the like. The validity duration of the second parameter may be determined based on a timer carried when the serving satellite delivers the second parameter, or may be determined in another manner. This is not specifically limited herein in this application.

In addition, after receiving the first parameter or the second parameter and a corresponding timer, the terminal determines a validation moment of the parameter. An invalidation moment of the parameter is calculated by the terminal based on validity duration of the parameter. An error of the invalidation moment may exceed a specification, and cannot meet a communications requirement. Not only the first parameter and the second parameter are updated to correct a TA, but also the network side device corrects errors of the first parameter and the second parameter through TAC indication. In a conventional technology, the TAC adjusts the TA in an accumulation manner. If a timing advance value corresponding to the TAC is accumulated when the first parameter is adjusted or the second parameter is adjusted, an error jump occurs during TA adjustment. If the first parameter and the second parameter are not updated simultaneously, when either parameter is adjusted, as the timing advance value corresponding to the TAC is accumulated, a TA error jump also occurs, because the TAC also corrects an error of the other parameter, but the terminal updates only one of the parameters. Therefore, only when the two parameters are updated simultaneously, and the timing advance value corresponding to the TAC including the two parameters is not accumulated during the update, the TA error jump does not occur.

The first parameter and the second parameter change continuously, which are validated at a moment, and may be invalidated at another moment. In addition, the first parameter and the second parameter have different validation and invalidation moments. Therefore, the first parameter and the second parameter are updated simultaneously at or before an earliest invalidation moment, to avoid accumulating, during calculation of the TA adjustment value, excessive TA errors related to the first parameter and the second parameter. In this manner, an error jump during determining of the TA adjustment value can be reduced, and accuracy of the TA adjustment value can be improved.

In an optional manner, the terminal may determine the TA adjustment value according to the following formula:

$$T_{TA}=(N_{TA,UE-specific}+N_{TA,common}+N_{TA,offset})\times T_c,$$

where $T_{TA}$ is the TA adjustment value, $N_{TA,UE-specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

In an optional manner, the terminal may determine the TA adjustment value based on the updated first parameter, the updated second parameter, and a first timing advance value $N_{TA}$. In this manner, impact of the TAC is considered, so that accuracy is higher during determining of the TA adjustment value.

In an optional manner, the TA adjustment value is determined according to the following formula:

$$T_{TA}=(N_{TA}+N_{TA,UE-specific}+N_{TA,common}+N_{TA,offset})\times T_c,$$

where $T_{TA}$ is the TA adjustment value, $N_{TA}$ is the first timing advance value, $N_{TA,UE-specific}$ is the timing advance value determined based on the ephemeris information of the serving satellite and the positioning information of the terminal, $N_{TA,common}$ is the timing advance value associated with the common TA information, $N_{TA,offset}$ is the timing offset, and $T_C$ is the minimum time unit.

In an optional manner, if the terminal sends an uplink signal and receives a TAC at a moment between a validation moment of an $i^{th}$ update of the first parameter and the second parameter and a validation moment of an $(i+1)^{th}$ update of the first parameter and the second parameter, when the first parameter and the second parameter are updated for the (i+1)th time, $N_{TA}=0$, where i is an integer.

It should be noted that, when the terminal receives a TAC between validation moments of two updates of the first parameter and the second parameter, it may be considered that the TAC has been invalidated. Therefore, when the first parameter and the second parameter are updated for the $(i+1)^{th}$ time, impact of $N_{TA}$ may not be considered, and the TA adjustment value may be determined directly based on the updated first parameter and second parameter.

In an optional manner, if the terminal sends an uplink signal before a validation moment of an $i^{th}$ update of the first parameter and the second parameter, and the terminal receives a TAC after an invalidation moment of the $i^{th}$ update of the first parameter and the second parameter, when the first parameter and the second parameter are updated for an $(i+1)^{th}$ time, $N_{TA}=0$, where i is an integer.

It should be noted that, when the terminal sends an uplink signal before a validation moment of an update of the first parameter and the second parameter, and receives a TAC after an invalidation moment of the update of the first parameter and the second parameter, it may be considered that the TAC has been invalidated. Therefore, when the first parameter and the second parameter are updated for the $(i+1)^{th}$ time, impact of $N_{TA}$ may not be considered, and the TA adjustment value may be determined directly based on the updated first parameter and second parameter.

According to a second aspect, this application provides a TA determining method. The method may be performed by a terminal. The terminal may be understood as a UE, an in-vehicle device, a chip of a terminal, or the like. A type of the terminal is not specifically limited herein in this application. The terminal may communicate with a satellite. In this application, the satellite may be a geostationary satellite, a non-geostationary satellite, an artificial satellite, a low earth orbit satellite, a medium earth orbit satellite, a high earth orbit satellite, or the like. This is not specifically limited herein in this application.

The terminal may obtain a first parameter and a second parameter. The first parameter includes positioning information of the terminal, and the second parameter includes one or more of the following information: ephemeris information of a serving satellite and common TA information. The terminal updates the first parameter or the second parameter at a first moment. The terminal receives a timing advance command TAC at a $j^{th}$ moment, and updates a first timing advance value $N_{TA}$ based on the TAC. The $j^{th}$ moment is an invalidation moment of the first parameter or the second parameter or is before the invalidation moment, and $2\leq j<N$. The terminal determines, at an $N^{th}$ moment, a TA adjustment value based on a component of updated $N_{TA}$ at an $(N-1)^{th}$ moment, and communicates with the serving satellite based on the TA adjustment value. The component of $N_{TA}$ is $\alpha N_{TA}$, and $0\leq\alpha\leq1$.

It should be noted that, considering a case in which the first parameter and the second parameter are not updated simultaneously, when either parameter is adjusted, even though a timing advance value corresponding to the TAC is not accumulated, a TA error jump still occurs, because the TAC also corrects an error of the other parameter. If the timing advance value corresponding to the TAC is accumulated, an error of the updated parameter is accumulated. Therefore, in this application, the component of the TAC is introduced to adjust the TA adjustment value. In this manner, an error jump during determining of the TA adjustment value can be reduced, and accuracy of the TA adjustment value can be improved.

In an optional manner, the TA adjustment value is determined according to the following formula:

$$T_{TA}=(\alpha N_{TA}+N_{TA,UE\text{-}specific}+N_{TA,common}+N_{TA,offset})\times T_c,$$

where $T_{TA}$ is the TA adjustment value, $N_{TA}$ is the first timing advance value, $\alpha N_{TA}$ is the component of $N_{TA}$, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

In an optional manner, if the terminal updates the second parameter at the first moment, $\alpha$ is negatively correlated with remaining duration of the positioning information of the terminal. It should be noted that longer remaining duration of the positioning information of the terminal indicates a smaller value of $\alpha$, and shorter remaining duration of the positioning information of the terminal indicates a larger value of $\alpha$. In this manner, an error jump during determining of the TA adjustment value can be reduced, and accuracy of the TA adjustment value can be improved.

In an optional manner, if the terminal updates the first parameter at the first moment, $\alpha$ is negatively correlated with remaining duration of the second parameter. It should be noted that longer remaining duration of the second parameter indicates a smaller value of $\alpha$, and shorter remaining duration of the second parameter indicates a larger value of $\alpha$. In this manner, an error jump during determining of the TA adjustment value can be reduced, and accuracy of the TA adjustment value can be improved.

In an optional manner, when a moving speed of the terminal is less than a first threshold, $\alpha=0$ when the second parameter is updated, and $\alpha=1$ when the first parameter is updated; or when a moving speed of the terminal is greater than a second threshold, $\alpha=1$ when the second parameter is updated, and $\alpha=0$ when the first parameter is updated; or when a moving speed of the terminal is greater than a first threshold and less than or equal to a second threshold, $\alpha\neq 0$ when the first parameter and the second parameter are updated.

Considering the moving speed of the terminal, at different speeds, a value of the component of $N_{TA}$ when the first parameter or the second parameter is updated is limited, so that an error jump during determining of the TA adjustment value can be reduced, and accuracy of the TA adjustment value can be improved.

According to a third aspect, this application provides a communications apparatus. The communications apparatus may be a terminal. The terminal may be understood as a UE, an in-vehicle device, a chip of a terminal, or the like. A type of the terminal is not specifically limited herein in this application.

The communications apparatus includes: a processing unit, configured to determine validity duration of a first parameter and validity duration of a second parameter, where the first parameter includes positioning information of the terminal, and the second parameter includes one or more of the following information: ephemeris information of a serving satellite and common TA information; determine an invalidation moment of the first parameter and an invalidation moment of the second parameter based on a validation moment of the first parameter, a validation moment of the second parameter, the validity duration of the first parameter, and the validity duration of the second parameter; update the first parameter and the second parameter at or before an earlier invalidation moment in the invalidation moment of the first parameter and the invalidation moment of the second parameter; and determine a TA adjustment value based on an updated first parameter and an updated second parameter; and an input/output unit, configured to communicate with the serving satellite based on the TA adjustment value.

In an optional manner, the TA adjustment value is determined according to the following formula:

$$T_{TA}=(N_{TA,UE\text{-}specific}+N_{TA,common}+N_{TA,offset})\times T_C,$$

where $T_{TA}$ is the TA adjustment value, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

In an optional manner, the processing unit is specifically configured to determine the TA adjustment value based on the updated first parameter, the updated second parameter, and a first timing advance value $N_{TA}$.

In an optional manner, the TA adjustment value is determined according to the following formula:

$$T_{TA}=(N_{TA}+N_{TA,UE\text{-}specific}+N_{TA,common}+N_{TA,offset})\times T_C,$$

where $T_{TA}$ is the TA adjustment value, $N_{TA}$ is the first timing advance value, $N_{TA,UE\text{-}specific}$ is the timing advance value determined based on the ephemeris information of the serving satellite and the positioning information of the terminal, $N_{TA,common}$ is the timing advance value associated with the common TA information, $N_{TA,offset}$ is the timing offset, and $T_C$ is the minimum time unit.

In an optional manner, if the input/output unit is further configured to send an uplink signal and receive a timing advance command TAC at a moment between a validation moment of an $i^{th}$ update of the first parameter and the second parameter and a validation moment of an $(i+1)^{th}$ update of the first parameter and the second parameter, when the processing unit updates the first parameter and the second parameter for the $(i+1)^{th}$ time, $N_{TA}=0$, where i is an integer.

In an optional manner, if the input/output unit is further configured to send an uplink signal before a validation moment of an $i^{th}$ update of the first parameter and the second parameter, and the input/output unit is further configured to receive a TAC after an invalidation moment of the $i^{th}$ update of the first parameter and the second parameter, when the processing unit updates the first parameter and the second parameter for an $(i+1)^{th}$ time, $N_{TA}=0$, where i is an integer.

According to a fourth aspect, this application provides a communications apparatus. The communications apparatus may be a terminal. The terminal may be understood as a UE, an in-vehicle device, a chip of a terminal, or the like. A type of the terminal is not specifically limited herein in this application.

The communications apparatus includes: a processing unit, configured to obtain a first parameter and a second parameter. The first parameter includes positioning information of the terminal, and the second parameter includes one or more of the following information: ephemeris information of a serving satellite and common TA information. The processing unit is configured to update the first parameter or the second parameter at a first moment. The processing unit is configured to receive a TAC at a $j^{th}$ moment, and updates a first timing advance value $N_{TA}$ based on the TAC. The $j^{th}$ moment is an invalidation moment of the first parameter or the second parameter or is before the invalidation moment, and $2 \le j < N$. The processing unit is configured to determine, at an $N^{th}$ moment, a TA adjustment value based on a component of updated $N_{TA}$ at an $(N-1)^{th}$ moment, and controls an input/output unit to communicate with the serving satellite based on the TA adjustment value. The component of $N_{TA}$ is $\alpha N_{TA}$, and $0 \le \alpha \le 1$.

In an optional manner, the TA adjustment value is determined according to the following formula:

$$T_{TA} = (\alpha N_{TA} + N_{TA,UE\text{-}specific} + N_{TA,common} + N_{TA,offset}) \times T_C,$$

where $T_{TA}$ is the TA adjustment value, $N_{TA}$ is the first timing advance value, $\alpha N_{TA}$ is the component of $N_{TA}$, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

In an optional manner, if the second parameter is updated at the first moment, $\alpha$ is negatively correlated with remaining duration of the positioning information of the terminal.

In an optional manner, if the first parameter is updated at the first moment, $\alpha$ is negatively correlated with remaining duration of the second parameter.

In an optional manner, when a moving speed of the terminal is less than a first threshold, $\alpha=0$ when the second parameter is updated, and $\alpha=1$ when the first parameter is updated; or when a moving speed of the terminal is greater than a second threshold, $\alpha=1$ when the second parameter is updated, and $\alpha=0$ when the first parameter is updated; or when a moving speed of the terminal is greater than a first threshold and less than or equal to a second threshold, $\alpha \ne 0$ when the first parameter and the second parameter are updated.

For the third aspect or the fourth aspect, it should be understood that the input/output unit may be referred to as a transceiver unit, a communications unit, or the like. When the communications apparatus is a terminal, the transceiver unit may be a transceiver, and the processing unit may be a processor. When the communications apparatus is a module (for example, a chip) in a terminal device, the transceiver unit may be an input/output interface, an input/output circuit, an input/output pin, or the like, and may also be referred to as an interface, a communications interface, an interface circuit, or the like; and the processing unit may be a processor, a processing circuit, a logic circuit, or the like.

According to a fifth aspect, this application provides a communications apparatus, including at least one processor and a memory. The memory is configured to store a computer program or instructions. When the apparatus runs, the at least one processor executes the computer program or instructions, to enable the communications apparatus to perform the method in the first aspect or the embodiments of the first aspect or the method in the second aspect or the embodiments of the second aspect.

According to a sixth aspect, this application provides another communications apparatus, including a logic circuit and an input/output interface. The input/output interface may be understood as an interface circuit, and the logic circuit may be configured to run code instructions to perform the method in the first aspect or the embodiments of the first aspect or the method in the second aspect or the embodiments of the second aspect.

According to a seventh aspect, this application further provides a computer-readable storage medium. The computer-readable storage medium stores computer-readable instructions. When the computer-readable instructions are run on a computer, the computer is enabled to perform the method in any one of the first aspect or the possible designs of the first aspect or the method in any one of the second aspect or the possible designs of the second aspect.

According to an eighth aspect, this application provides a computer program product including instructions. When the computer program product runs on a computer, the computer is enabled to perform the method in the first aspect or the embodiments of the first aspect or the method in the second aspect or the embodiments of the second aspect.

According to a ninth aspect, this application provides a chip system. The chip system includes a processor, may further include a memory, and is configured to implement the method in any one of the first aspect or the possible designs of the first aspect or the method in any one of the second aspect or the possible designs of the second aspect. The chip system may include a chip, or may include a chip and another discrete component.

According to a tenth aspect, this application provides a communications system. The system includes a terminal and a satellite, and the terminal is configured to perform the method in any one of the first aspect or the possible designs of the first aspect or the method in any one of the second aspect or the possible designs of the second aspect.

For technical effects that can be achieved in the third aspect to the tenth aspect, refer to descriptions of technical effects that can be achieved by corresponding possible design solutions in the first aspect or the second aspect. Details are not described herein again in this application.

DESCRIPTION OF EMBODIMENTS

To make objectives, technical solutions, and advantages of this application clearer, the following further describes this application in detail with reference to accompanying drawings. A specific operation method in a method embodiment may also be applied to an apparatus embodiment or a system embodiment. In descriptions of this application, unless otherwise stated, "a plurality of" means two or more than two. Therefore, for implementations of the apparatus and the method, reference may be made to each other, and details are not repeated.

Figure 1:
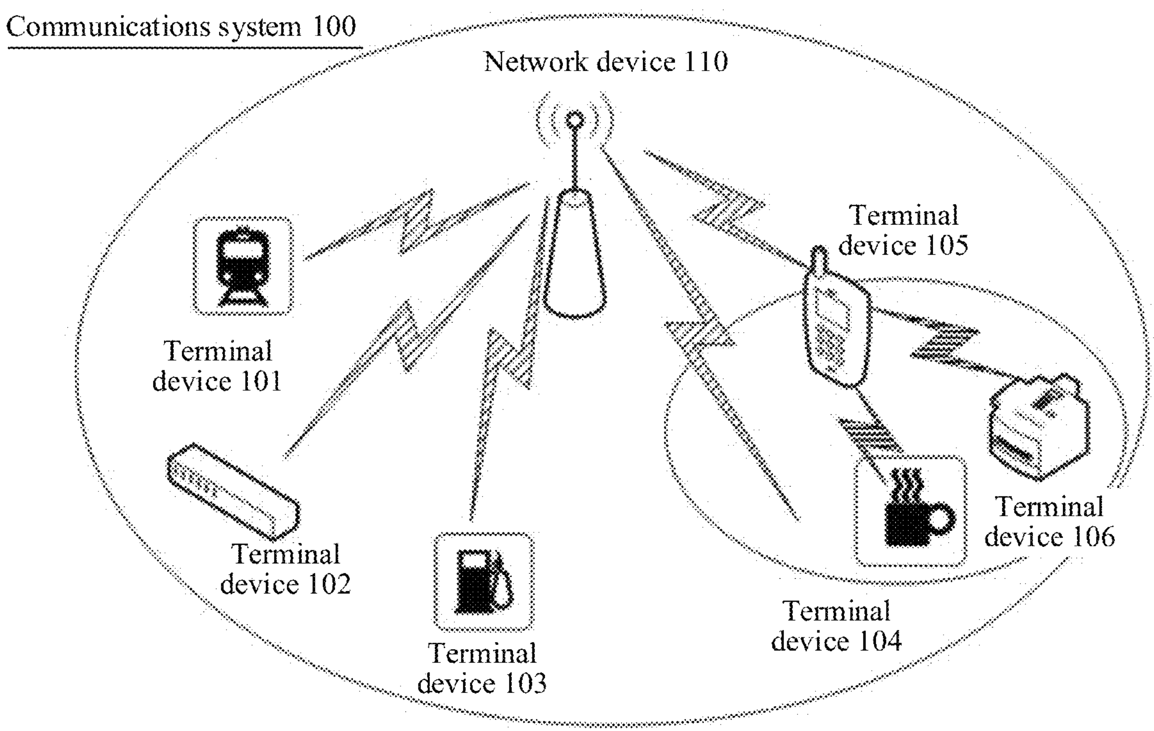
FIG. 1 is a schematic diagram of a terrestrial communications system.

FIG. 1 shows an architecture of a terrestrial network communications system. The communications system 100 may include a network device 110 and a terminal device 101 to a terminal device 106. It should be understood that the communications system 100 may include more or fewer network devices or terminal devices. The network device or the terminal device may be hardware, or may be software obtained through function division, or may be a combination thereof. In addition, the terminal device 104 to the terminal device 106 may constitute a communications system. For example, the terminal device 105 may send downlink data to the terminal device 104 or the terminal device 106. The network device and the terminal device may communicate with each other through another device or network element. The network device 110 may send downlink data to the terminal device 101 to the terminal device 106, and may receive uplink data sent by the terminal device 101 to the terminal device 106. Certainly, the terminal device 101 to the terminal device 106 may also send uplink data to the network device 110, and may receive downlink data sent by the network device 110.

The network device 110 is a node in a radio access network (RAN), and may also be referred to as a base station or a RAN node (or device). Currently, for example, the network device is a gNB/NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), a network device in a 5G communications system, or a network device in a future possible communications system. Alternatively, the network device 110 may be another device having a network device function. For example, the network device 110 may be a device implementing a network device function in D2D communication. Alternatively, the network device 110 may be a network device in a future possible communications system.

The terminal device 101 to the terminal device 106 each may also be referred to as a UE, a mobile station (MS), a mobile terminal (MT), or the like, and are devices that provide voice or data connectivity for a user, or may be internet of things devices. For example, the terminal device 101 to the terminal device 106 include handheld devices, in-vehicle devices, or the like that have a wireless connection function. Currently, the terminal device 101 to the terminal device 106 each may be a mobile phone, a tablet computer, a notebook computer, a palmtop computer, a mobile internet device (MID), a wearable device (for example, a smartwatch, a smart band, or a pedometer), an in-vehicle device (for example, on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. Alternatively, the terminal device 101 to the terminal device 106 may be other devices having a terminal function. For example, the terminal device 101 to the terminal device 106 may be devices implementing a terminal function in D2D communication.

Figure 2:
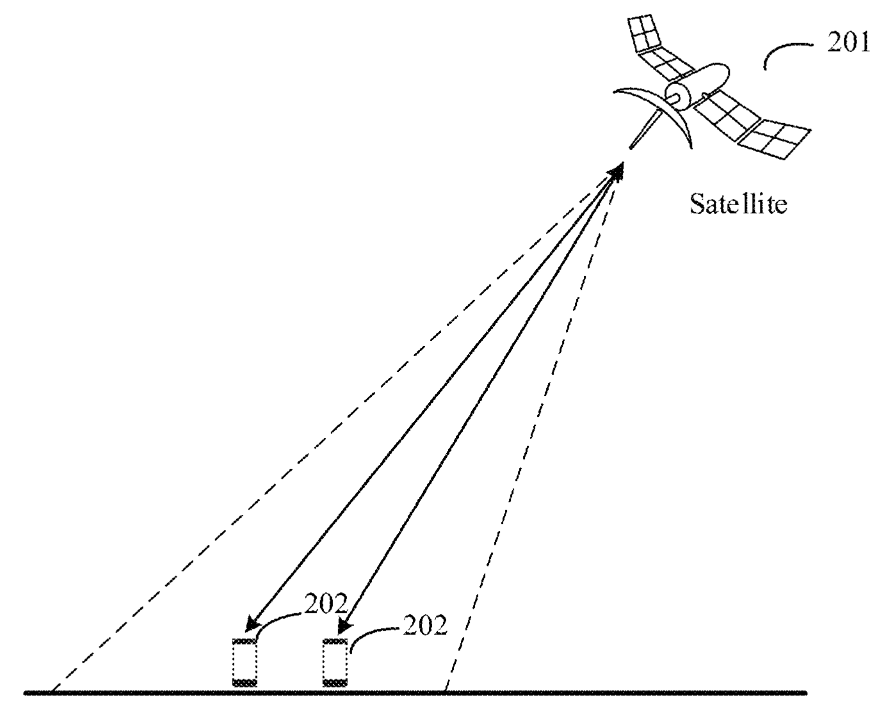
FIG. 2 is a schematic diagram of a non-terrestrial communications system according to an embodiment of this application.

Based on the description of the architecture of the terrestrial network communications system shown in FIG. 1, a TA determining method provided in embodiments of this application may apply to a non-terrestrial network (NTN) communications system. As shown in FIG. 2, the NTN communications system includes a satellite 201 and a terminal device 202. For an explanation of the terminal device 202, refer to related descriptions of the terminal device 101 to the terminal device 106. The satellite 201 may also be referred to as a high-altitude platform, a high-altitude aircraft, or a satellite base station. Upon comparison between the NTN communications system and the terrestrial network communications system, the satellite 201 may be considered as one or more network devices in the architecture of the terrestrial network communications system. The satellite 201 provides a communications service for the terminal device 202, and the satellite 201 may be further connected to a core network device. For a structure and a function of the satellite, refer to the foregoing description of the network device. For a communications manner between the satellite 201 and the terminal device 202, refer to the description in FIG. 1. Details are not described herein again.

Figure 3:
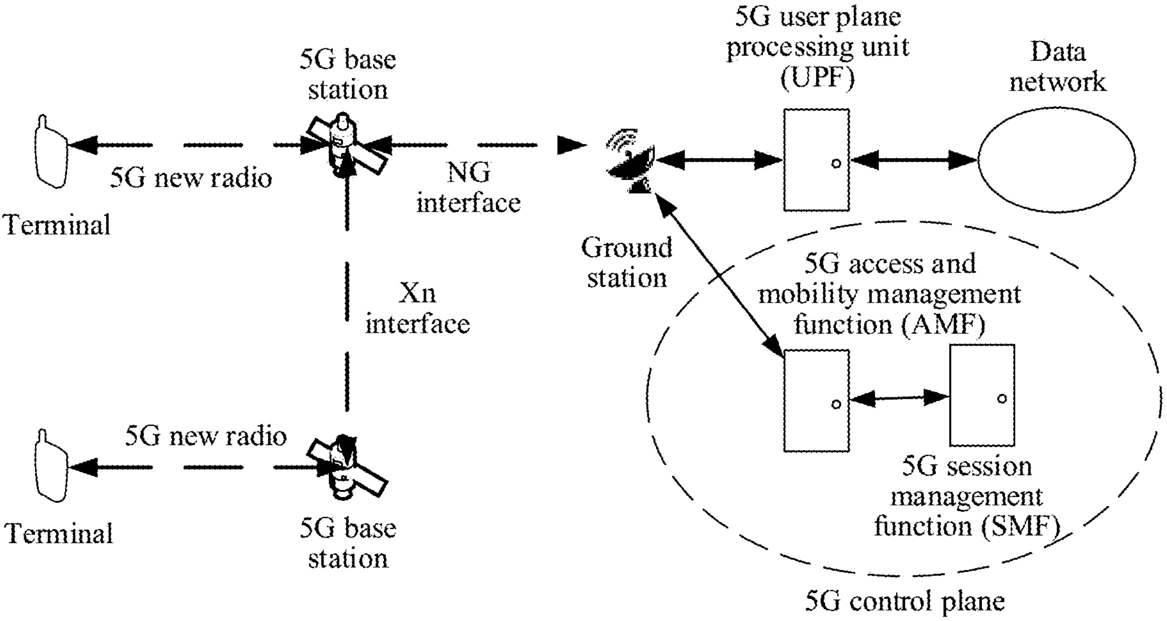
FIG. 3 is a schematic diagram of an architecture of a 5th generation (5G) satellite communications system according to an embodiment of this application.

5G is used as an example. An architecture of a 5G satellite communications system is shown in FIG. 3. A terrestrial terminal device accesses a network through 5G new radio. A 5G base station is deployed on a satellite, and is connected to a terrestrial core network over a radio link. In addition, there is a radio link between satellites, to complete signaling exchange and user data transmission between base stations. Devices and interfaces in FIG. 3 are described as follows:

5G core network: It provides services such as user access control, mobility management, session management, user security authentication, and charging, and includes a plurality of functional units, which may be classified into a control plane functional entity and a data plane functional entity. An access and mobility management function (AMF) is responsible for user access management, security authentication, and mobility management. A user plane function (UPF) is responsible for managing functions such as user plane data transmission and traffic statistics.

Terrestrial station: responsible for forwarding signaling and service data between a satellite base station and the 5G core network.

5G new radio: It is a radio link between a terminal and a base station.

Xn interface: It is an interface between 5G base stations, and mainly used for signaling exchange, for example, a handover.

NG interface: It is an interface between the 5G base station and the 5G core network, and mainly exchanges NAS or other signaling of the core network and service data of a user.

The network device in the terrestrial network communications system and the satellite in the NTN communications system may be collectively considered as a network device. An apparatus configured to implement a function of a network device may be the network device, or may be an apparatus, for example, a chip system, that can support the network device in implementing the function. The apparatus may be installed in the network device. When the technical solutions provided in embodiments of this application are described below, an example in which the apparatus configured to implement a function of a network device is a satellite is used to describe the technical solutions provided in embodiments of this application. It may be understood that, when the method provided in embodiments of this application is applied to the terrestrial network communications system, an action performed by the satellite may be performed by a base station or a network device.

In embodiments of this application, an apparatus configured to implement a function of a terminal device may be the terminal device, or may be an apparatus, for example, a chip system, that can support the terminal device in implementing the function. The apparatus may be installed in the terminal device. In embodiments of this application, the chip system may include a chip, or may include a chip and another discrete component. In the technical solutions provided in embodiments of this application, an example in which the apparatus configured to implement a function of a terminal device is a terminal or a UE is used to describe the technical solutions provided in embodiments of this application.

In addition, the satellite may be a geostationary satellite, a non-geostationary satellite, an artificial satellite, a low earth orbit satellite, a medium earth orbit satellite, a high earth orbit satellite, or the like. This is not specifically limited herein in this application.

As described in the background, in a conventional technology, when a TA adjustment value is determined, after receiving a TAC, a terminal determines $N_{TA}$ by accumulating a corresponding TA, and determines the TA adjustment value based on the determined $N_{TA}$. Each time the terminal receives a TAC, the terminal superimposes the TAC onto a previous TA, as shown in the following formula 1:

$$N_{TA\_new} = N_{TA\_old} + (T_A - 31) \cdot 16 \cdot 64 / 2^{\mu} \qquad \text{Formula 1}$$

$T_A$ may be understood as a timing advance value determined based on the TAC, $N_{TA}$_old may be understood as a value of $N_{TA}$ when the TA adjustment value is determined last time, and μ may be understood as a scale factor of a subcarrier spacing relative to a reference subcarrier spacing.

When a TAC closed-loop TA adjustment mechanism is directly applied to satellite communication, a terminal corrects an ephemeris information, common TA information, or GNSS error when performing location update or ephemeris update. However, after the terminal receives a TAC, $N_{TA}$ accumulates in a TA adjustment value determined by the terminal. As a result, more ephemeris information, common TA information, or GNSS errors may accumulate in the TA adjustment value determined by the terminal, and the determined TA adjustment value is inaccurate. For example:

At a $T_0$ moment, the terminal listens to ephemeris information or common TA information, and updates a GNSS.

At a $T_1$ moment, the terminal sends an uplink signal to a network side.

At a $T_2$ moment, the terminal receives a TAC and adjusts a TA adjustment value based on the TAC. The TAC is determined after the network side performs estimation on the uplink signal sent by the terminal at the $T_1$ moment, and the TAC may indicate to correct an error of the GNSS, the ephemeris information, or the common TA information at the $T_1$ moment.

At a $T_3$ moment, the terminal updates the ephemeris information, the GNSS, or the common TA information to compensate for errors of these parameters. However, $N_{TA}$ accumulated when the TAC is previously received still exists. As a result, the determined TA adjustment value is inaccurate.

Figure 4:
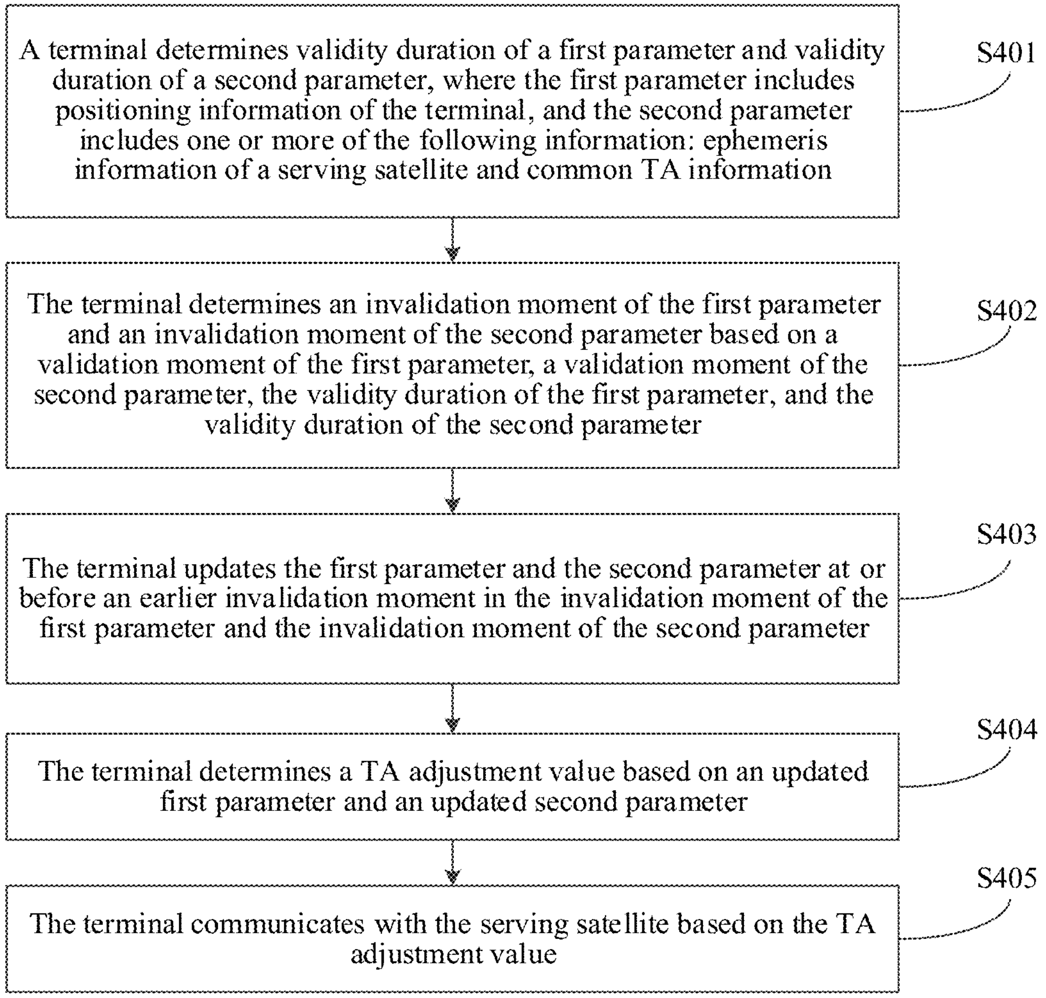
FIG. 4 is a schematic flowchart of a TA determining method according to an embodiment of this application.

Considering the foregoing case, this application provides a TA determining method, to reduce an error jump during determining of a TA adjustment value, and improve accuracy of the TA adjustment value. The method may be performed by a terminal. The terminal may be understood as a UE, an in-vehicle device, a chip of a terminal, or the like. A type of the terminal is not specifically limited herein in this application. With reference to FIG. 4, the following steps may be performed:

Step 401: The terminal determines validity duration of a first parameter and validity duration of a second parameter, where the first parameter includes positioning information of the terminal, and the second parameter includes one or more of the following information: ephemeris information of a serving satellite and common TA information.

It should be noted that the first parameter includes the positioning information of the terminal, and the positioning information of the terminal may be indicated by using a GNSS capability. During positioning, to reduce device power consumption, the terminal may not perform real-time positioning, but the terminal may keep performing a positioning operation within a period of time. This period of time may be understood as validity duration. The validity duration of the positioning information of the terminal may be determined based on a moving speed of the terminal. For example, a slower moving speed of the terminal indicates longer validity duration of the GNSS, and a higher moving speed of the terminal indicates shorter validity duration of the GNSS. Alternatively, the validity duration of the positioning information of the terminal may be determined based on duration of a timer delivered by a network device. The network side device may be understood as the serving satellite, a terrestrial gateway, a terrestrial base station, or the like. For example, the duration of the timer delivered by the serving satellite is 10 seconds (s), and the validity duration of the GNSS may be 5 s. This is merely an example for description herein, and does not constitute a specific limitation. Alternatively, the validity duration of the positioning information of the terminal may be determined based on validity duration, delivered by the serving satellite, of terminal positioning information. For example, duration of a plurality of GNSSs delivered by the serving satellite is 10 s, 5 s, 15 s, and the like. The terminal may determine, based on a device capability, a current moving speed, and the like, to select duration as the validity duration of the GNSS. Alternatively, the positioning information of the terminal may be determined based on a location change of the terminal between two times of GNSS positioning and a time interval between the two times of GNSS positioning. This is merely an example for description herein, and does not constitute a specific limitation. Alternatively, the positioning information of the terminal may be indicated by using BeiDou positioning information. This is not specifically limited herein in this application.

In addition, the second parameter may include only the ephemeris information of the serving satellite, or may include only the common TA information, or may include both the ephemeris information of the serving satellite and the common TA information. This is not specifically limited herein in this application, and may be flexibly determined based on actual application. Generally, the serving satellite continuously broadcasts the second parameter, and the second parameter does not need to be updated by the terminal device. The terminal only needs to listen to the second parameter at a moment. Therefore, in this application, updating the second parameter is understood as listening to the second parameter or obtaining the second parameter. In actual application, both the ephemeris information of the serving satellite and the common TA information are delivered by the serving satellite. The serving satellite may put two pieces of information and one piece of timer information into one message (for example, a system information block (SIB) message), so that the terminal determines validity duration of the ephemeris information of the serving satellite and validity duration of the common TA information based on the timer information. Alternatively, the serving satellite may put the ephemeris information of the serving satellite and the common TA information into different messages. For example, the serving satellite delivers a message A, and the message A carries the ephemeris information of the serving satellite and the timer information; and the serving satellite delivers a message B, and the message B carries the common TA information and the timer information. The terminal may determine the validity duration of the ephemeris information of the serving satellite based on the message A, and may determine the validity duration of the common TA based on the message B.

Step 402: The terminal determines an invalidation moment of the first parameter and an invalidation moment of the second parameter based on a validation moment of the first parameter, a validation moment of the second parameter, the validity duration of the first parameter, and the validity duration of the second parameter.

Figure 5:
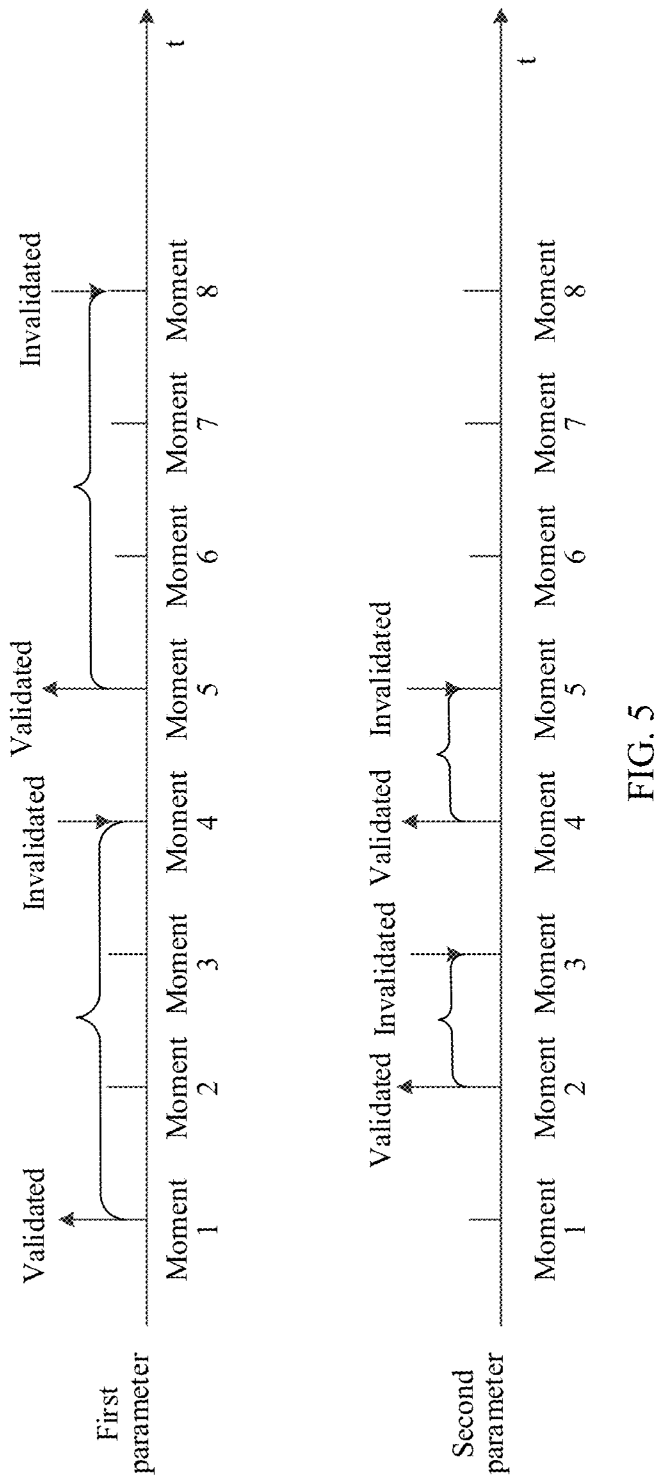
FIG. 5 is a schematic diagram of a time sequence of a first parameter and a second parameter.

For example, if the validation moment of the first parameter is a time point 1, and the validity duration of the first parameter is 10 s, the invalidation moment of the first parameter is a time point corresponding to the time point 1 plus 10 s; if the validation moment of the second parameter is a time point 2, and the validity duration of the second parameter is 5 s, the invalidation moment of the second parameter is a time point corresponding to the time point 2 plus 5 s. The time point 1 and the time point 2 may be a same time point, or may be different time points. This is not specifically limited herein in this application. FIG. 5 shows an example of validation moments and invalidation moments of the first parameter and the second parameter. The first parameter is validated at a moment 1, and is invalidated at a moment 4, and the first parameter is validated again at a moment 5, and is invalidated at a moment 8. The second parameter is validated at a moment 2, and is invalidated at a moment 3, and the second parameter is validated again at the moment 4, and is invalidated at the moment 5. This is merely an example for description herein, and does not constitute a specific limitation.

Figure 6:
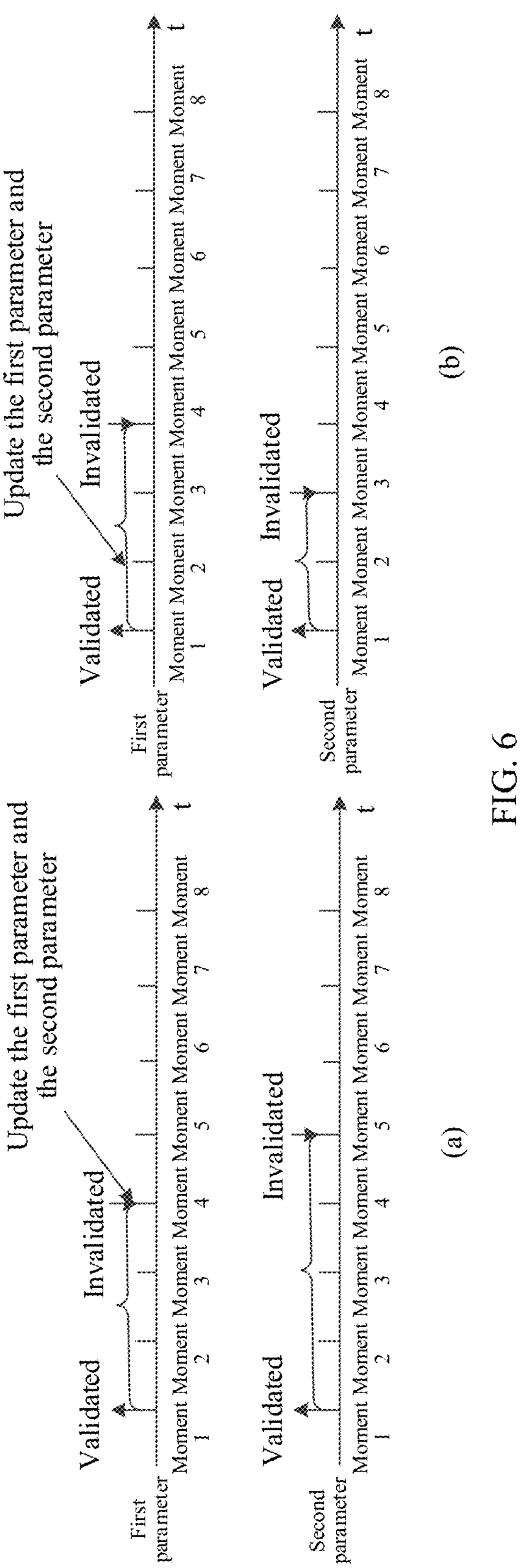
FIG. 6 is a schematic diagram of a time sequence of a first parameter and a second parameter according to an embodiment of this application.

Step 403: Update the first parameter and the second parameter at or before an earlier invalidation moment in the invalidation moment of the first parameter and the invalidation moment of the second parameter. FIG. 5 is used as an example. The moment 3 is the earlier invalidation moment in the invalidation moments of the first parameter and the second parameter. In this application, the first parameter and the second parameter may be simultaneously updated at the moment 3 or before the moment 3. This can reduce an error jump during determining of a TA adjustment value, and improve accuracy of the TA adjustment value. In addition, when the validation moment of the first parameter is the same as the validation moment of the second parameter, as shown in (a) in FIG. 6, the validity duration of the first parameter is less than the validity duration of the second parameter, and the first parameter and the second parameter may be updated at the invalidation moment of the first parameter or before the invalidation moment. As shown in the figure, the update is performed at the invalidation moment (a moment 4) of the first parameter. As shown in (b) in FIG. 6, the validity duration of the first parameter is greater than the validity duration of the second parameter, the first parameter and the second parameter may be updated at the invalidation moment of the second parameter or before the invalidation moment. As shown in the figure, the update is performed (at a moment 2) before the invalidation moment of the second parameter.

It should be further noted that, if the second parameter includes only the ephemeris information of the serving satellite or the common TA information, the invalidation moment of the second parameter may be an invalidation moment of the ephemeris information of the serving satellite, or may be an invalidation moment of the common TA information. If the second parameter includes both the ephemeris information of the serving satellite and the common TA information, the invalidation moment of the second parameter includes both the invalidation moment of the ephemeris information of the serving satellite and the invalidation moment of the common TA information. The invalidation moment of the first parameter is compared with the invalidation moment of the ephemeris information of the serving satellite and the invalidation moment of the common TA information, and an earliest invalidation moment in the three invalidation moments is determined as an update moment of the first parameter and the second parameter. Without loss of generality, in this embodiment of this application, for example, the second parameter includes the ephemeris information of the serving satellite and the common TA information with a same invalidation moment.

Step 404: The terminal determines a TA adjustment value based on an updated first parameter and an updated second parameter.

In an optional embodiment, the terminal may determine the TA adjustment value according to the following formula 2:

$$T_{TA}=(N_{TA,UE\text{-}specific}+N_{TA,common}+N_{TA,offset})\times T_C \quad \text{Formula 2}$$

$T_{TA}$ is the TA adjustment value, $N_{TA,UE\text{-}specific}$ is a timing advance value determined based on the ephemeris information of the satellite and the positioning information of the terminal, $N_{TA,common}$ is a timing advance value associated with the common TA, $N_{TA,offset}$ is a timing offset, and $T_C$ is a minimum time unit.

In actual application, after receiving the first parameter or the second parameter and a corresponding timer, the terminal determines a validation moment of the parameter. An invalidation moment of the parameter is calculated by the terminal based on validity duration of the parameter. An error of the invalidation moment may exceed a specification, and cannot meet a communications requirement. Not only the first parameter and the second parameter are updated to correct a TA, but also the network side device corrects errors of the first parameter and the second parameter through TAC indication. In a conventional technology, the TAC adjusts the TA in an accumulation manner. If a timing advance value corresponding to the TAC is accumulated when the first parameter is adjusted or the second parameter is adjusted, an error jump occurs during TA adjustment. If the first parameter and the second parameter are not updated simultaneously, when either parameter is adjusted, as the timing advance value corresponding to the TAC is accumulated, a TA error jump also occurs, because the TAC also corrects an error of the other parameter, but the terminal updates only one of the parameters. Therefore, only when the two parameters are updated simultaneously, and the timing advance value corresponding to the TAC including the two parameters is not accumulated during the update, the TA error jump does not occur.

Step 405: The terminal communicates with the serving satellite based on the TA adjustment value.

The first parameter and the second parameter change, which are validated at a moment, and may be invalidated at another moment. In addition, the first parameter and the second parameter have different validation and invalidation moments. Therefore, the first parameter and the second parameter are updated simultaneously at or before an earliest invalidation moment, to avoid accumulating, during calculation of the TA adjustment value, excessive TA errors related to the first parameter and the second parameter. In this manner, an error jump during determining of the TA adjustment value can be reduced, and accuracy of determining the TA adjustment value can be improved.

In an optional manner, the terminal may alternatively determine the TA adjustment value based on the updated first parameter, the updated second parameter, and a first timing advance value $N_{TA}$. It should be noted that $N_{TA}$ is determined based on a TAC. Impact of the TAC is considered, so that accuracy is higher during determining of the TA adjustment value.

In an optional manner, the TA adjustment value may be determined according to the following formula 3:

$$T_{TA} = (N_{TA} + N_{TA,UE\text{-}specific} + N_{TA,common} + N_{TA,offset}) \times T_C \qquad \text{Formula 3}$$

$T_{TA}$ is the TA adjustment value, NA is the first timing advance value, $N_{TA,UE\text{-}specific}$ is the timing advance value determined based on the ephemeris information of the serving satellite and the positioning information of the terminal, $N_{TA,common}$ is the timing advance value associated with the common TA, $N_{TA,offset}$ is the timing offset, and $T_C$ is the minimum time unit.

Figure 7:
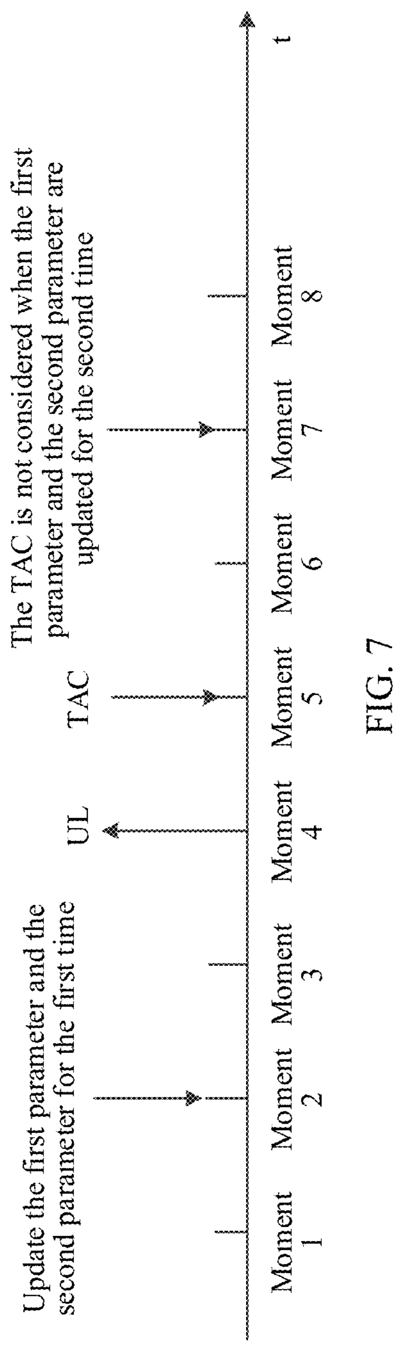
FIG. 7 is a schematic diagram of an update scenario according to an embodiment of this application.

In an optional manner, if the terminal sends an uplink signal and receives a TAC at a moment between a validation moment of an $i^{th}$ update of the first parameter and the second parameter and a validation moment of an $(i+1)^{th}$ update of the first parameter and the second parameter, when the first parameter and the second parameter are updated for the $(i+1)^{th}$ time, $N_{TA}=0$, where i is an integer. As shown in FIG. 7, the terminal sends an uplink signal (denoted by UL in the figure) after the first parameter and the second parameter are updated for a first time, and receives a TAC before the first parameter and the second parameter are updated for a second time. Because the TAC is sent after the first parameter and the second parameter are updated for the first time, the TAC has been invalidated. When the first parameter and the second parameter are updated for the second time, impact of the TAC may not be considered.

Figure 8:
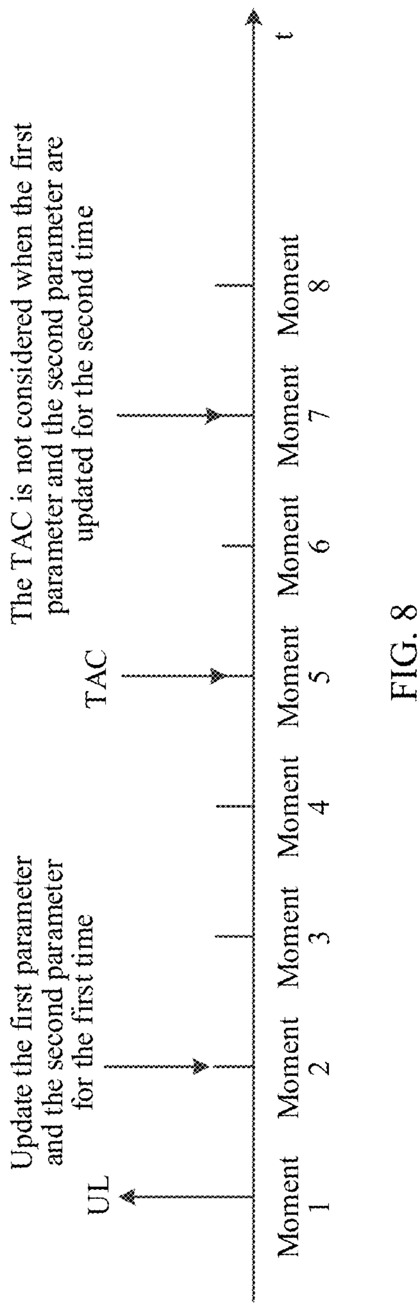
FIG. 8 is a schematic diagram of an update scenario according to an embodiment of this application.

In an optional manner, if the terminal sends an uplink signal before a validation moment of an $i^{th}$ update of the first parameter and the second parameter, and the terminal receives a TAC after an invalidation moment of the $i^{th}$ update of the first parameter and the second parameter, when the first parameter and the second parameter are updated for an $(i+1)^{th}$ time, $N_{TA}=0$, where i is an integer. As shown in FIG. 8, the terminal sends an uplink signal (denoted by UL in the figure) before the first parameter and the second parameter are updated for a first time, and receives a TAC before the first parameter and the second parameter are updated for a second time. Because the TAC is sent after the first parameter and the second parameter are updated for the first time, the TAC has been invalidated. When the first parameter and the second parameter are updated for the second time, impact of the TAC may not be considered.

In addition, when the terminal is in a connected mode, because the terminal updates the GNSS and listens to ephemeris information and/or common TA information, when $N_{TA,UE\text{-}specific}$ is updated, $N_{TA}=0$. When the terminal sends an uplink signal before updating the GNSS and listening to the ephemeris information and/or the common TA information, and receives a corresponding TAC after updating the GNSS and listening to the ephemeris information and/or the common TA information, $N_{TA}=0$. In addition to the foregoing cases, when the terminal receives a TAC carried in Msg2/MsgB, $N_{TA}$ may be determined based on $N_{TA\_new}=N_{TA\_old}+T_A \cdot 16 \cdot 64/2^{\mu}$. When in the connected mode, the terminal receives a TAC carried in a media access control control element (MAC CE), $N_{TA}$ may be updated according to the foregoing formula 1.

In actual application, the first parameter and the second parameter may not be updated simultaneously. Considering that the first parameter and the second parameter are not updated in real time, to reduce an error jump in determining the TA adjustment value, refer to a method shown in FIG. 9. For meanings of the first parameter, the second parameter, and the like, refer to the foregoing descriptions. Details are not described herein again in this application.

Step 901: A terminal obtains a first parameter and a second parameter, where the first parameter includes positioning information of the terminal, and the second parameter includes one or more of the following information: ephemeris information of a serving satellite and common TA information.

Step 902: The terminal updates the first parameter or the second parameter at a first moment.

Step 903: The terminal receives a TAC at a $j^{th}$ moment, and updates $N_{TA}$ based on the TAC. The $j^{th}$ moment is an invalidation moment of the first parameter or the second parameter or is before the invalidation moment, and $2 \leq j < N$. Refer to the foregoing formula 1. When the terminal receives a TAC for the first time, an initial value of the first timing advance value $N_{TA}$ is generally 0. Subsequently, after a TAC is received, a value of $N_{TA}$ may be determined by referring to formula 1. That is, $N_{TA}$ determined after a TAC is received last time is used as $N_{TA\_old}$ to determine $N_{TA}$ determined after a TAC is received currently. However, in actual application, $N_{TA}$ may be accumulated to 0 again. This is not specifically limited herein in this application, and needs to be specifically determined based on an actual application situation. Therefore, an initial value of the TAC received at the $j^{th}$ moment may be 0, or may be a value obtained after a last update, or may be a preset fixed value or a value obtained based on the updated first parameter and/or second parameter and a preset operation relationship. This is not limited in this application.

It should be noted that, if the terminal updates the first parameter at the first moment, the $j^{th}$ moment is the invalidation moment of the first parameter, or is before the invalidation moment of the first parameter. If the terminal updates the second parameter at the first moment, the $j^{th}$ moment is the invalidation moment of the second parameter, or is before the invalidation moment of the second parameter. In actual application, the h moment may be flexibly determined based on the parameter updated at the first moment. In addition, the first moment is a moment before the $j^{th}$ moment, and a specific time interval needs to be determined based on when the terminal receives the TAC in actual application. For example, the time interval is 2 s, that is, the time interval between the first moment and the $j^{th}$ moment is 2 s.

It should be noted that, if N=1, the terminal has not received a TAC when $N_{TA}$ needs to be updated, and even if there is a TAC, the terminal chooses not to receive the TAC. If N=2, at the $(N=2)^{nd}$ moment, the terminal may just receive a TAC at the moment, and may not have time to update the first timing advance value based on the TAC. Therefore, when N=2, the terminal does not update the first timing advance value based on the TAC. It should be further noted that there may be a plurality of TAC receiving moments (namely, $j^{th}$ moments) between the first moment and the $N^{th}$ moment, and the plurality of TAC receiving moments may be periodic or aperiodic. This is not specifically limited herein in this application. The terminal receives a TAC at each TAC receiving moment, and a timing advance corresponding to each TAC is adjusted according to formula 1. Therefore, in this embodiment of this application, N>2 is considered.

It should be further noted that, the serving satellite may estimate, based on an uplink signal, an error of an uplink TA at a t1 moment, including two parts Te(t1) and GNSSe(t1). Te(t1) indicates an error of the second parameter, and GNSSe(t1) indicates an error of the first parameter. The terminal listens to the second parameter (it is assumed that the second parameter includes the ephemeris information of the serving satellite and the common TA information) at a t2 moment, and receives a TAC closed-loop message at a t3 moment (that is, the terminal listens to the ephemeris information and the common TA information once between sending the uplink signal and receiving the corresponding TAC). If the terminal directly accumulates $N_{TA}$ based on the TAC, the terminal re-accumulates the error Te(t1) of the ephemeris information and the common TA information at the t1 moment (but actually, the ephemeris information and the common TA information have been updated at this time). To reduce a TA accumulation error, the terminal needs to adjust a closed-loop TAC accumulation manner. (In an ideal case, the terminal needs to accumulate only a part that is in the TAC and that is used to correct a GNSS error, namely, GNSSe(t1), but the terminal cannot actually learn a value of this part of component.) In addition, because the serving satellite evaluates the TA deviation and sends the TAC when the ephemeris information is about to expire, it indicates that an error of the ephemeris information is large. However, the GNSS has not expired, indicating that a GNSS positioning error is still not large. Therefore, it may be considered that Te(t1) is a main factor in Te(t1)+GNSSe(t1). Therefore, after the terminal receives new ephemeris information and common TA information, if the terminal receives a TAC corresponding to an uplink signal before the ephemeris update, $N_{TA}$ is not accumulated.

If the terminal updates the GNSS at the t2 moment (the ephemeris information and/or the common TA information are/is not updated), and the terminal receives a TAC closed-loop message at the t3 moment (that is, the terminal listens to the GNSS once between sending the uplink signal and receiving the corresponding TAC), if the terminal directly accumulates $N_{TA}$ based on the TAC, the terminal re-accumulates the error GNSSe(t1) of the GNSS at the t1 moment (but the GNSS has been updated at this time). (In an ideal case, the terminal needs to accumulate only a part that is in the TAC and that is used to correct an ephemeris information error, namely, Te(t1), but the terminal cannot actually learn a value of this part of component.) Because the serving satellite evaluates the TA deviation and sends the TAC when the GNSS is about to expire, it indicates that an error of the GNSS is large. However, an error of the ephemeris information is still not large. Therefore, it may be considered that GNSSe(t1) is a main factor in Te(t1)+GNSSe(t1). Therefore, after the terminal updates the GNSS, if the terminal receives a TAC corresponding to an uplink signal before the GNSS update, $N_{TA}$ is not accumulated.

Step 904: The terminal determines, at an $N^{th}$ moment, a TA adjustment value based on a component of updated $N_{TA}$ at an $(N-1)^{th}$ moment, and communicates with the serving satellite based on the TA adjustment value. The component of $N_{TA}$ is $\alpha N_{TA}$, and $0 \leq \alpha \leq 1$.

It should be noted that time intervals between adjacent moments of the first moment to the $N^{th}$ moment may be different, which are non-periodic update moments. In actual application, a time interval between the first moment and the $N^{th}$ moment needs to be determined based on a service requirement of the terminal, which may be 10 s, or may be 5 s. This is not specifically limited herein. After the $(N-1)^{th}$ moment, that is, the last time when a TAC is received between the first moment and the $N^{th}$ moment, a moment of $N_{TA}$ is determined based on the TAC. For example, after the first moment and before the $N^{th}$ moment, the terminal receives TACs three times. A first TAC receiving moment to a third TAC receiving moment are all $j^{th}$ moments. The third TAC receiving moment may be understood as the $(N-1)^{th}$ moment. In addition, a time interval between the $(N-1)^{th}$ moment and the $N^{th}$ moment is not specifically limited, and may be flexibly determined based on an actual service requirement of the terminal.

It should be noted that, considering a case in which the first parameter and the second parameter are not updated simultaneously, when either parameter is adjusted, even though a timing advance value corresponding to the TAC is not accumulated, a TA error jump still occurs, because the TAC also corrects an error of the other parameter. If the timing advance value corresponding to the TAC is accumulated, an error of the updated parameter is accumulated.

Therefore, in this application, the component of the TAC is introduced to adjust the TA adjustment value. In this manner, an error jump during determining of the TA adjustment value can be reduced, and accuracy of the TA adjustment value can be improved.

In an optional manner, the TA adjustment value is determined according to the following formula 4:

$$T_{TA}=(\alpha N_{TA}+N_{TA,UE\text{-}specific}+N_{TA,common}+N_{TA,offset})\times T_C \quad \text{Formula 4}$$

$T_{TA}$ is the TA adjustment value, $N_{TA}$ is the first timing advance value, $\alpha N_{TA}$ is the component of $N_{TA}$, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

Considering that a TA error includes two parts Te(t1) and GNSSe(t1) after the terminal receives a TAC, if a TAC is received when either the first parameter or the second parameter is updated, if the TAC is not accumulated, determining of the TA adjustment value may be inaccurate. In actual application, it may be assumed that the error GNSSe (t1) of the first parameter accounts for 50% of the total error, and the error Te(t1) of the second parameter accounts for 50% of the total error. Assuming that a TAC is received after the first parameter is updated, when the TA adjustment value is determined, it may be determined, based on remaining duration of the second parameter, to accumulate a part, all, or none of $N_{TA}$ corresponding to the TAC, that is, a component of $N_{TA}$. For example, after the first parameter is updated, the terminal receives a TAC. During determining of the TA adjustment value, if finding that the remaining duration of the second parameter is greater than a first preset threshold, when determining the TA adjustment value, the terminal may accumulate 0% of ½ $N_{TA}$. If finding that the remaining duration of the second parameter is less than a second preset threshold, when determining the TA adjustment value, the terminal may accumulate 100% of ½ $N_{TA}$. If finding that the remaining duration of the second parameter is greater than the second preset threshold and less than the first preset threshold, when determining the TA adjustment value, the terminal may accumulate X % of ½ $N_{TA}$. A value of X is (0, 100). This is merely an example for description herein. Certainly, the errors of the first parameter and the second parameter may not each account for 50%, but one may account for 40% and the other may account for 60%, which may be determined based on the validity duration of the first parameter and the second parameter. For example, the validity duration of the first parameter is 3 s, and the validity duration of the second parameter is 1 s. In this case, ¾ (3/(1+3)) of the TA error may correspond to the error of the first parameter, and ¼ (1/(1+3)) may correspond to the error of the second parameter. This is not specifically limited herein in this application.

In an optional manner, if the terminal updates the second parameter at the first moment, α is negatively correlated with remaining duration of the positioning information of the terminal. It should be noted that longer remaining duration of the positioning information of the terminal indicates a smaller value of α, and shorter remaining duration of the positioning information of the terminal indicates a larger value of α. In this manner, an error jump during determining of the TA adjustment value can be reduced, and accuracy of the TA adjustment value can be improved. If the terminal updates the first parameter at the first moment, α is negatively correlated with remaining duration of the second parameter. Longer remaining duration of the second parameter indicates a smaller value of α, and shorter remaining duration of the second parameter indicates a larger value of α. In this manner, an error jump during determining of the TA adjustment value can be reduced, and accuracy of the TA adjustment value can be improved.

In actual application, a value of α may be determined according to a formula or by querying a table, for example, may be determined according to α=βt. It is assumed that t indicates the remaining duration of the positioning information (GNSS) of the terminal. In actual application, t may alternatively indicate the remaining duration of the second parameter. β is a predefined parameter, and a value of the parameter is related to a value of the validity duration. To describe the solution of this application more clearly, the value of α may be determined based on the following Table 1. If the terminal updates the second parameter at the first moment, when the validity duration of the GNSS is 10 s and the remaining duration of the GNSS is 2 s, the value of α is 0.8. This is merely an example for description herein. In actual application, only one or more rows in the table may be applied. This is not limited herein in this application.

TABLE 1

| Validity duration of the GNSS | Remaining duration of the GNSS | α |
|---|---|---|
| 10 s | 2 s | 0.8 |
| 10 s | 8 s | 0.2 |
| 20 s | 1 s | 0.95 |
| . . . | . . . | . . . |

In actual application, if the terminal updates the first parameter at the first moment, and the second parameter includes only the ephemeris information of the serving satellite or the common TA information, the value of α may be determined by referring to the following Table 2. The following second parameter may be the ephemeris information of the satellite, or may be the common TA information. Details are not described herein. When the validity duration of the second parameter is 12 s, and the remaining duration of the second parameter is 2 s, the value of α is ⅚. This is merely an example for description herein. In actual application, only one or more rows in the table may be applied. This is not limited herein in this application.

TABLE 2

| Validity duration of the second parameter | Remaining duration of the second parameter | α |
|---|---|---|
| 12 s | 2 s | ⅚ |
| 12 s | 8 s | ⅓ |
| 20 s | 1 s | 0.95 |
| . . . | . . . | . . . |

In actual application, if the terminal updates the first parameter at the first moment, and the second parameter includes ephemeris information of the serving satellite and the common TA information, which have different validity duration, the value of α may be determined by referring to the following Table 3. During actual calculation, total validity duration may be determined by adding the validity duration of the ephemeris information of the serving satellite and the validity duration of the common TA information, total remaining duration may be determined by adding the remaining duration of the ephemeris information of the serving satellite and the remaining duration of the common TA information, and α is determined based on a relationship between the total remaining duration and the total validity duration. For example, when the validity duration of the ephemeris information of the serving satellite is 12 s, and the remaining duration of the ephemeris information of the serving satellite is 8 s, the validity duration of the common TA information is 12 s, and the remaining duration of the common TA information is 3 s, the total validity duration is 24 s (12 s+12 s), the total remaining duration is 11 s (8 s+3 s), and the value of α is 13/24 ((24−11)/24). This is merely an example for description herein. In actual application, only one or more rows in the table may be applied. This is not limited herein in this application.

TABLE 3

| Validity duration of the ephemeris information of the serving satellite | Remaining duration of the ephemeris information of the serving satellite | Validity duration of the common TA information | Remaining duration of the common TA information | α |
|---|---|---|---|---|
| 12 s | 3 s | 12 s | 4 s | 7/12 |
| 12 s | 8 s | 12 s | 3 s | 13/24 |
| 15 s | 8 s | 10 s | 2 s | 3/5 |
| 10 s | 5 s | 8 s | 1 s | 2/3 |
| 15 s | 5 s | 10 s | 5 s | 3/5 |
| . . . | . . . | . . . | . . . | . . . |

In addition, it should be further noted that α in Table 1 to Table 3 may be a value determined based on the remaining duration of the second parameter or the first parameter after proportions of the error of the first parameter and the error of the second parameter are determined. For example, the error of the first parameter accounts for 80% of the total error, a value Y is determined based on the remaining duration of the first parameter, and a value determined by multiplying Y by 80% is α. Alternatively, α may be a value determined directly based on the remaining duration of the first parameter or the remaining duration of the second parameter. This is not specifically limited herein in this application.

In an optional manner, when a moving speed of the terminal is less than a first threshold, α=0 when the second parameter is updated, and α=1 when the first parameter is updated; or when a moving speed of the terminal is greater than a second threshold, α=1 when the second parameter is updated, and α=0 when the first parameter is updated; or when a moving speed of the terminal is greater than a first threshold and less than or equal to a second threshold, α≠0 when the first parameter and the second parameter are updated. Considering the moving speed of the terminal, at different speeds, a value of the component of $N_{TA}$ when the first parameter or the second parameter is updated is limited, so that an error jump during determining of the TA adjustment value can be reduced, and accuracy of the TA adjustment value can be improved.

Figures 9, 10:
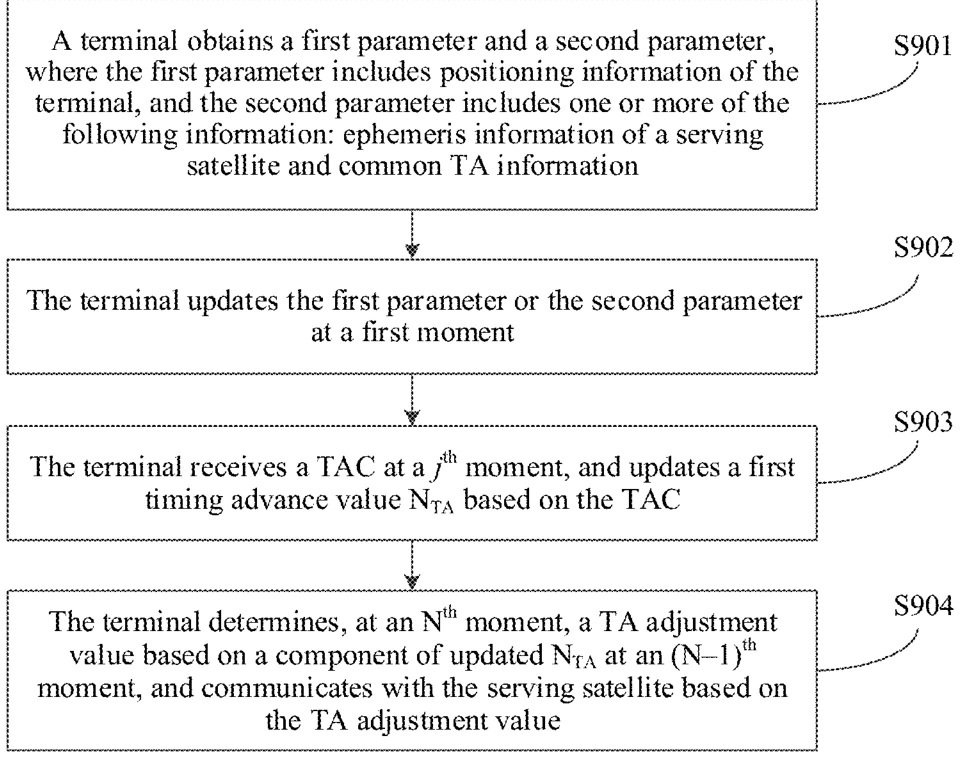
FIG. 9 is a schematic flowchart of a TA determining method according to an embodiment of this application.
FIG. 10 is a schematic diagram of a structure of a communications apparatus according to an embodiment of this application.

In actual application, the validity duration of the first parameter may be different from the validity duration of the second parameter. When the validity duration of the first parameter differs greatly from the validity duration of the second parameter, for example, the validity duration of the first parameter is 3 s, and the validity duration of the second parameter is 10 s, if the first parameter and the second parameter are updated simultaneously, the TA adjustment value may be updated excessively frequently. Considering this case, a validity duration threshold may be set. If the validity duration of the first parameter and the second parameter is less than the validity duration threshold, a method of simultaneously updating the first parameter and the second parameter may be used, that is, the TA determining method in the embodiment corresponding to FIG. 4 is used to determine the TA adjustment value. If the validity duration of the first parameter and the second parameter is greater than the validity duration threshold, the method of not simultaneously updating the first parameter and the second parameter may be used, that is, the TA determining method in the embodiment corresponding to FIG. 9 is used to determine the TA adjustment value. In both of the TA determining methods corresponding to the embodiments, an error jump during determining of the TA adjustment value can be reduced, and accuracy of the TA adjustment value can be improved.

Based on a same concept, this application provides a communications apparatus, as shown in FIG. 10. The communications apparatus includes an input/output unit 1001 and a processing unit 1002. The communications apparatus may be understood as a terminal. This is not specifically limited herein in this application. It should be understood that the input/output unit may be referred to as a transceiver unit, a communications unit, or the like. When the communications apparatus is a terminal device, the transceiver unit may be a transceiver, and the processing unit may be a processor. When the communications apparatus is a module (for example, a chip) in a terminal, the transceiver unit may be an input/output interface, an input/output circuit, an input/output pin, or the like, and may also be referred to as an interface, a communications interface, an interface circuit, or the like; and the processing unit may be a processor, a processing circuit, a logic circuit, or the like.

The processing unit 1002 is configured to determine validity duration of a first parameter and validity duration of a second parameter, where the first parameter includes positioning information of the terminal, and the second parameter includes one or more of the following information: ephemeris information of a serving satellite and common TA information; determine an invalidation moment of the first parameter and an invalidation moment of the second parameter based on a validation moment of the first parameter, a validation moment of the second parameter, the validity duration of the first parameter, and the validity duration of the second parameter; update the first parameter and the second parameter at or before an earlier invalidation moment in the invalidation moment of the first parameter and the invalidation moment of the second parameter; and determine a TA adjustment value based on an updated first parameter and an updated second parameter. The input/ output unit 1001 is configured to communicate with the serving satellite based on the TA adjustment value.

The first parameter and the second parameter change, which are validated at a moment, and may be invalidated at another moment. In addition, the first parameter and the second parameter have different validation and invalidation moments. Therefore, the first parameter and the second parameter are updated simultaneously at or before an earliest invalidation moment, to avoid accumulating, during calculation of the TA adjustment value, excessive TA errors related to the first parameter and the second parameter. In this manner, an error jump during determining of the TA adjustment value can be reduced, and accuracy of the TA adjustment value can be improved.

In an optional manner, the TA adjustment value is determined according to the following formula:

$$T_{TA} = (N_{TA,UE\text{-}specific} + N_{TA,common} + N_{TA,offset}) \times T_C,$$

where $T_{TA}$ is the TA adjustment value, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

In an optional manner, the processing unit 1002 is specifically configured to determine the TA adjustment value based on the updated first parameter, the updated second parameter, and a first timing advance value $N_{TA}$. In this manner, impact of the TAC is considered, so that accuracy is higher during determining of the TA adjustment value.

In an optional manner, the TA adjustment value is determined according to the following formula:

$$T_{TA} = (N_{TA} + N_{TA,UE\text{-}specific} + N_{TA,common} + N_{TA,offset}) \times T_C,$$

where $T_{TA}$ is the TA adjustment value, $N_{TA}$ is the first timing advance value, $N_{TA,UE\text{-}specific}$ is the timing advance value determined based on the ephemeris information of the serving satellite and the positioning information of the terminal, $N_{TA,common}$ is the timing advance value associated with the common TA information, $N_{TA,offset}$ is the timing offset, and $T_C$ is the minimum time unit.

In an optional manner, if the input/output unit 1001 is further configured to send an uplink signal and receive a TAC at a moment between a validation moment of an $i^{th}$ update of the first parameter and the second parameter and a validation moment of an $(i+1)^{th}$ update of the first parameter and the second parameter, when the processing unit 1002 updates the first parameter and the second parameter for the $(i+1)^{th}$ time, $N_{TA}=0$, where i is an integer.

It should be noted that, when the terminal receives a TAC between validation moments of two updates of the first parameter and the second parameter, it may be considered that the TAC has been invalidated. Therefore, when the first parameter and the second parameter are updated for the $(i+1)^{th}$ time, impact of $N_{TA}$ may not be considered, and the TA adjustment value may be determined directly based on the updated first parameter and second parameter.

In an optional manner, if the input/output unit is further configured to send an uplink signal before a validation moment of an $i^{th}$ update of the first parameter and the second parameter, and the input/output unit 1001 is further configured to receive a TAC after an invalidation moment of the $i^{th}$ update of the first parameter and the second parameter, when the processing unit 1002 updates the first parameter and the second parameter for an $(i+1)^{th}$ time, $N_{TA}=0$, where i is an integer.

It should be noted that, when the terminal sends an uplink signal before a validation moment of an update of the first parameter and the second parameter, and receives a TAC after an invalidation moment of the update of the first parameter and the second parameter, it may be considered that the TAC has been invalidated. Therefore, when the first parameter and the second parameter are updated for the $(i+1)^{th}$ time, impact of $N_{TA}$ may not be considered, and the TA adjustment value may be determined directly based on the updated first parameter and second parameter.

In another embodiment, the processing unit 1002 of the communications apparatus may be configured to obtain a first parameter and a second parameter. The first parameter includes positioning information of the terminal, and the second parameter includes one or more of the following information: ephemeris information of a serving satellite and common TA information. The communications apparatus is configured to update the first parameter or the second parameter at a first moment. The communications apparatus is configured to receive a TAC at a $j^{th}$ moment, and updates a first timing advance value $N_{TA}$ based on the TAC. The $j^{th}$ moment is an invalidation moment of the first parameter or the second parameter or is before the invalidation moment, and $2 \leq j < N$. The communications apparatus is configured to determine, at an $N^{th}$ moment, a TA adjustment value based on a component of updated $N_{TA}$ at an $(N-1)^{th}$ moment, and controls the input/output unit 1001 to communicate with the serving satellite based on the TA adjustment value. The component of $N_{TA}$ is $\alpha N_{TA}$, and $0 \approx \alpha \leq 1$.

It should be noted that, considering a case in which the first parameter and the second parameter are not updated simultaneously, when either parameter is adjusted, even though a timing advance value corresponding to the TAC is not accumulated, a TA error jump still occurs, because the TAC also corrects an error of the other parameter. If the timing advance value corresponding to the TAC is accumulated, an error of the updated parameter is accumulated. Therefore, in this application, the component of the TAC is introduced to adjust the TA adjustment value. In this manner, an error jump during determining of the TA adjustment value can be reduced, and accuracy of the TA adjustment value can be improved.

In an optional manner, the TA adjustment value is determined according to the following formula:

$$T_{TA} = (\alpha N_{TA} + N_{TA,UE\text{-}specific} + N_{TA,common} + N_{TA,offset}) \times T_C,$$

where $T_{TA}$ is the TA adjustment value, $N_{TA}$ is the first timing advance value, $\alpha N_{TA}$ is the component of $N_{TA}$, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

In an optional manner, if the second parameter is updated at the first moment, α is negatively correlated with remaining duration of the positioning information of the terminal. It should be noted that longer remaining duration of the positioning information of the terminal indicates a smaller value of α, and shorter remaining duration of the positioning information of the terminal indicates a larger value of α. In this manner, an error jump during determining of the TA adjustment value can be reduced, and accuracy of the TA adjustment value can be improved.

In an optional manner, if the first parameter is updated at the first moment, α is negatively correlated with remaining duration of the second parameter. It should be noted that longer remaining duration of the second parameter indicates a smaller value of α, and shorter remaining duration of the second parameter indicates a larger value of α. In this manner, an error jump during determining of the TA adjustment value can be reduced, and accuracy of the TA adjustment value can be improved.

In an optional manner, when a moving speed of the terminal is less than a first threshold, α=0 when the second parameter is updated, and α=1 when the first parameter is updated; or when a moving speed of the terminal is greater than a second threshold, α=1 when the second parameter is updated, and α=0 when the first parameter is updated; or when a moving speed of the terminal is greater than a first threshold and less than or equal to a second threshold, α≠0 when the first parameter and the second parameter are updated. Considering the moving speed of the terminal, at different speeds, a value of the component of $N_{TA}$ when the first parameter or the second parameter is updated is limited, so that an error jump during determining of the TA adjustment value can be reduced, and accuracy of the TA adjustment value can be improved.

Figure 11:
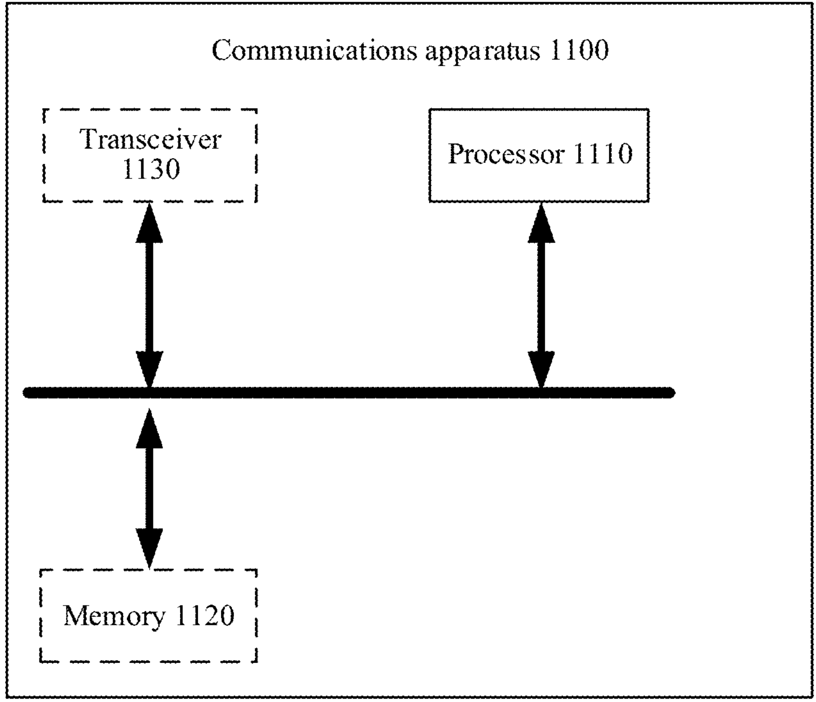
FIG. 11 is a schematic diagram of a structure of a communications apparatus according to an embodiment of this application.

In addition, as shown in FIG. 11, this application further provides a communications apparatus 1100. For example, the communications apparatus 1100 may be a chip or a chip system. Optionally, in this embodiment of this application, the chip system may include a chip, or may include a chip and another discrete component.

The communications apparatus 1100 may include at least one processor 1110, and the communications apparatus 1100 may further include at least one memory 1120 configured to store a computer program, program instructions, and/or data. The memory 1120 is coupled to the processor 1110. The coupling in this embodiment of this application may be an indirect coupling or a communications connection between apparatuses, units, or modules in an electrical form, a mechanical form, or another form, and is used for information exchange between the apparatuses, the units, or the modules. The processor 1110 and the memory 1120 may operate cooperatively. The processor 1110 may execute the computer program stored in the memory 1120. Alternatively, the at least one memory 1120 may be integrated with the processor 1110.

Optionally, in actual application, the communications apparatus 1100 may or may not include the transceiver 1130, and the communications apparatus may or may not include the memory 1120, which are shown as dashed boxes. The communications apparatus 1100 may exchange information with another device through the transceiver 1130. The transceiver 1130 may be a circuit, a bus, a transceiver, or any other apparatus that may be configured to exchange information.

In a possible implementation, the communications apparatus 1100 may be used in the foregoing terminal. The memory 1120 stores a computer program, program instructions, and/or data necessary for implementing a function of the terminal in any one of the foregoing embodiments. The processor 1110 may execute the computer program stored in the memory 1120, to complete the method in any one of the foregoing embodiments.

A specific connection medium between the transceiver 1130, the processor 1110, and the memory 1120 is not limited in this embodiment of this application. In this embodiment of this application, the memory 1120, the processor 1110, and the transceiver 1130 are connected through a bus in FIG. 11. The bus is represented by a bold line in FIG. 11. A manner of connection between other components is merely an example for description, and does not constitute a limitation. The bus may be classified into an address bus, a data bus, a control bus, and the like. For ease of representation, only one bold line is used to represent the bus in FIG. 11, but this does not mean that there is only one bus or only one type of bus. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory may be a non-volatile memory, for example, a hard disk drive (HDD) or a solid-state drive (SSD), or may be a volatile memory, for example, a random access memory (RAM). Alternatively, the memory may be any other medium that can be configured to carry or store expected program code in a form of an instruction or a data structure and that can be accessed by a computer, but is not limited thereto. Alternatively, the memory in this embodiment of this application may be a circuit or any other apparatus that can implement a storage function, and is configured to store a computer program, program instructions, and/or data.

Figure 12:
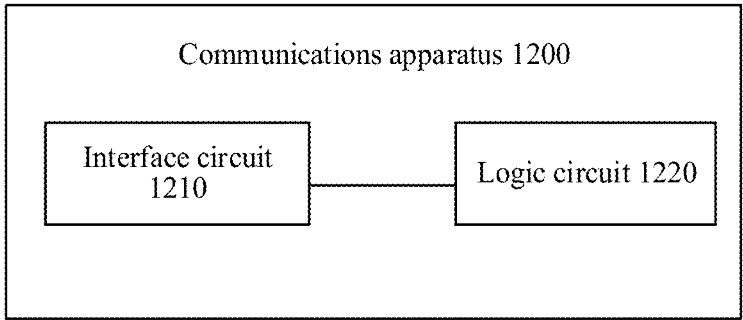
FIG. 12 is a schematic diagram of a structure of a communications apparatus according to an embodiment of this application.

Based on the foregoing embodiments, with reference to FIG. 12, an embodiment of this application further provides another communications apparatus 1200, including an interface circuit 1210 and a logic circuit 1220. The interface circuit 1210 may be understood as an input/output interface, and may be configured to perform the same operation steps as the input/output unit shown in FIG. 10 or the transceiver shown in FIG. 11. Details are not described herein again in this application. The logic circuit 1220 may be configured to run code instructions to perform the method in any one of the foregoing embodiments, and may be understood as the processing unit in FIG. 10 or the processor in FIG. 11, and may implement the same function as the processing unit or the processor. Details are not described herein again in this application.

Based on the foregoing embodiments, an embodiment of this application further provides a readable storage medium. The readable storage medium stores instructions. When the instructions are executed, the TA determining method in any one of the foregoing embodiments is implemented. The readable storage medium may include any medium that can store program code, such as a USB flash drive, a removable hard disk drive, a read-only memory, a random access memory, a magnetic disk, or an optical disc.

A person skilled in the art should understand that an embodiment of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer-usable storage media (including but not limited to a magnetic disk storage, a CD-ROM, an optical memory, and the like) that include computer-usable program code.

This application is described with reference to the flowcharts and/or the block diagrams of the method, the apparatus (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing apparatus to generate a machine, so that the instructions executed by a computer or the processor of any other programmable data processing apparatus generate an apparatus for implementing a specific function in one or more procedures in the flowcharts and/or in one or more blocks in the block diagrams.

Alternatively, these computer program instructions may be stored in a computer-readable memory that can indicate the computer or another programmable data processing apparatus to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

Alternatively, these computer program instructions may be loaded onto a computer or another programmable data processing apparatus, so that a series of operation steps are performed on the computer or the another programmable apparatus to generate computer-implemented processing. Therefore, the instructions executed on the computer or another programmable apparatus provide steps for implementing a specific function in one or more procedures in the flowcharts and/or in one or more blocks in the block diagrams.

What is claimed is:

1. A method for determining timing advance, comprising:

determining, by a terminal, a validity duration of a first parameter and a validity duration of a second parameter, wherein the first parameter comprises positioning information of the terminal, and the second parameter comprises one or more of the following information: ephemeris information of a serving satellite, or common timing advance (TA) information;

determining, by the terminal, an invalidation moment of the first parameter and an invalidation moment of the second parameter based on a validation moment of the first parameter, a validation moment of the second parameter, the validity duration of the first parameter, and the validity duration of the second parameter;

updating, by the terminal, the first parameter and the second parameter at or before an earlier invalidation moment in the invalidation moment of the first parameter and the invalidation moment of the second parameter;

determining, by the terminal, a TA adjustment value based on an updated first parameter and an updated second parameter; and communicating, by the terminal, with the serving satellite based on the TA adjustment value.

2. The method according to claim 1, wherein the TA adjustment value is determined according to the following formula:

$$T_{TA}=(N_{TA,UE\text{-}specific}+N_{TA,common}+N_{TA,offset})\times T_C,$$

wherein $T_{TA}$ is the TA adjustment value, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

3. The method according to claim 1, wherein the determining, by the terminal, a TA adjustment value based on an updated first parameter and an updated second parameter comprises:

determining, by the terminal, the TA adjustment value based on the updated first parameter, the updated second parameter, and a first timing advance value ($N_{TA}$).

4. The method according to claim 3, wherein the TA adjustment value is determined according to the following formula:

$$T_{TA}=(N_{TA}+N_{TA,UE\text{-}specific}+N_{TA,common}+N_{TA,offset})\times T_C,$$

wherein $T_{TA}$ is the TA adjustment value, $N_{TA}$ is the first timing advance value, $N_{TA,UE\text{-}specific}$ is a timing advance value determined based on the ephemeris information of the serving satellite and the positioning information of the terminal, $N_{TA,common}$ is the timing advance value associated with the common TA information, $N_{TA,\ offset}$ is a timing offset, and $T_C$ is a minimum time unit.

5. The method according to claim 3, further comprising:

if the terminal sends an uplink signal and receives a timing advance command (TAC) at a moment between a validation moment of an $i^{th}$ update of the first parameter and the second parameter and a validation moment of an $(i+1)^{th}$ update of the first parameter and the second parameter, when the first parameter and the second parameter are updated for the $(i+1)^{th}$ time, determining that $N_{TA}=0$, wherein i is an integer.

6. The method according to claim 3, further comprising:

if the terminal sends an uplink signal before a validation moment of an $i^{th}$ update of the first parameter and the second parameter, and the terminal receives a TAC after an invalidation moment of the $i^{th}$ update of the first parameter and the second parameter, when the first parameter and the second parameter are updated for an $(i+1)^{th}$ time, determining that $N_{TA}=0$, wherein i is an integer.

7. A method for determining timing advance, comprising:

obtaining, by a terminal, a first parameter and a second parameter, wherein the first parameter comprises positioning information of the terminal, and the second parameter comprises one or more of the following information: ephemeris information of a serving satellite, or common timing advance (TA) information;

updating, by the terminal, the first parameter or the second parameter at a first moment;

receiving, by the terminal, a timing advance command (TAC) at a $j^{th}$ moment, and updating a first timing advance value $N_{TA}$ based on the TAC, wherein the $j^{th}$ moment is an invalidation moment of the first parameter or the second parameter, or the $i^{th}$ moment is a moment before the invalidation moment of the first parameter or the second parameter, and $2 \leq j < N$; and determining, by the terminal at an $N^{th}$ moment, a TA adjustment value based on a component of updated $N_{TA}$ at an $(N-1)^{th}$ moment, and communicating with the serving satellite based on the TA adjustment value, wherein the component of $N_{TA}$ is $\alpha N_{TA}$, and $0 \leq \alpha \leq 1$.

8. The method according to claim 7, wherein the TA adjustment value is determined according to the following formula:

$$T_{TA} = (\alpha N_{TA} + N_{TA,UE\text{-}specific} + N_{TA,common} + N_{TA,offset}) \times T_C,$$

wherein $T_{TA}$ is the TA adjustment value, $N_{TA}$ is the first timing advance value, $\alpha N_{TA}$ is the component of $N_{TA}$, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

9. The method according to claim 7, wherein if the terminal updates the second parameter at the first moment, $\alpha$ is negatively correlated with remaining duration of the positioning information of the terminal.

10. The method according to claim 7, wherein if the terminal updates the first parameter at the first moment, $\alpha$ is negatively correlated with remaining duration of the second parameter.

11. The method according to claim 7, further comprising wherein:

when a moving speed of the terminal is less than a first threshold, $\alpha=0$ when the second parameter is updated, and $\alpha=1$ when the first parameter is updated; or when a moving speed of the terminal is greater than a second threshold, $\alpha=1$ when the second parameter is updated, and $\alpha=0$ when the first parameter is updated; or when a moving speed of the terminal is greater than a first threshold and less than or equal to a second threshold, $\alpha \neq 0$ when the first parameter and the second parameter are updated.

12. A communications apparatus implemented in a terminal, comprising:

at least one processor; and one or more memories coupled to the at least one processor and storing programming instructions for execution by the at least one processor to perform operations comprising:

determining a validity duration of a first parameter and a validity duration of a second parameter, wherein the first parameter comprises positioning information of the terminal, and the second parameter comprises one or more of the following information: ephemeris information of a serving satellite, or common timing advance (TA) information;

determining an invalidation moment of the first parameter and an invalidation moment of the second parameter based on a validation moment of the first parameter, a validation moment of the second parameter, the validity duration of the first parameter, and the validity duration of the second parameter;

updating the first parameter and the second parameter at or before an earlier invalidation moment in the invalidation moment of the first parameter and the invalidation moment of the second parameter;

determining a TA adjustment value based on an updated first parameter and an updated second parameter; and communicating with the serving satellite based on the TA adjustment value.

13. The communications apparatus according to claim 12, wherein the TA adjustment value is determined according to the following formula:

$$T_{TA} = (N_{TA,UE\text{-}specific} + N_{TA,common} + N_{TA,offset}) \times T_C,$$

wherein $T_{TA}$ is the TA adjustment value, $N_{TA,UE\text{-}specific}$ is a timing advance value determined based on the ephemeris information of the serving satellite and the positioning information of the terminal, $N_{TA,common}$ is a timing advance value associated with the common TA information, $N_{TA,offset}$ is a timing offset, and $T_C$ is a minimum time unit.

14. The communications apparatus according to claim 12, wherein the determining, by the terminal, a TA adjustment value based on an updated first parameter and an updated second parameter comprises:

determining, by the terminal, the TA adjustment value based on the updated first parameter, the updated second parameter, and a first timing advance value ($N_{TA}$).

15. The communications apparatus according to claim 14, wherein the TA adjustment value is determined according to the following formula:

$$T_{TA} = (N_{TA} + N_{TA,UE\text{-}specific} + N_{TA,common} + N_{TA,offset}) \times T_C,$$

wherein $T_{TA}$ is the TA adjustment value, $N_{TA}$ is the first timing advance value, $N_{TA,UE\text{-}specific}$ is a timing advance value determined based on the ephemeris information of the serving satellite and the positioning information of the terminal, $N_{TA,common}$ is the timing advance value associated with the common TA information, $N_{TA,\ offset}$ is a timing offset, and $T_C$ is a minimum time unit.

16. The communications apparatus according to claim 14, wherein the one or more memories store programing instructions for execution by the at least one processor to perform operations comprising:

if the terminal sends an uplink signal and receives a timing advance command (TAC) at a moment between a validation moment of an $i^{th}$ update of the first parameter and the second parameter and a validation moment of an $(i+1)^{th}$ update of the first parameter and the second parameter, when the first parameter and the second parameter are updated for the $(i+1)^{th}$ time, determining that $N_{TA}=0$, wherein i is an integer.

17. The communications apparatus according to claim 14, wherein the one or more memories store programing instructions for execution by the at least one processor to perform operations comprising:

if the terminal sends an uplink signal before a validation moment of an $i^{th}$ update of the first parameter and the second parameter, and the terminal receives a TAC after an invalidation moment of the $i^{th}$ update of the first parameter and the second parameter, when the first parameter and the second parameter are updated for an $(i+1)^{th}$ time, determining that $N_{TA}=0$, wherein i is an integer.

* * * * *